US012125264B1

(12) United States Patent
Park et al.

(10) Patent No.: US 12,125,264 B1
(45) Date of Patent: Oct. 22, 2024

(54) DEEP LEARNING-BASED QUALITY INSPECTION SYSTEM APPLICABLE TO INJECTION PROCESS AND CONTROL METHOD THEREOF

(71) Applicant: INTER X Co., Ltd., Ulsan (KR)

(72) Inventors: Jung Ywn Park, Ulsan (KR); Ha Il Jung, Ulsan (KR); Jeong Hyun Park, Ulsan (KR); Qing Tang, Ulsan (KR)

(73) Assignee: INTER X Co., Ltd., Ulsan (KR)

( * ) Notice: Subject to any disclaimer, the term of this patent is extended or adjusted under 35 U.S.C. 154(b) by 0 days.

(21) Appl. No.: 18/784,389

(22) Filed: Jul. 25, 2024

(30) Foreign Application Priority Data

Jul. 27, 2023 (KR) ........................ 10-2023-0098387

(51) Int. Cl.
| | |
|---|---|
| *G06V 10/77* | (2022.01) |
| *G06T 7/00* | (2017.01) |
| *G06V 10/56* | (2022.01) |
| *G06V 10/75* | (2022.01) |
| *G06V 10/20* | (2022.01) |

(52) U.S. Cl.
CPC .......... *G06V 10/7715* (2022.01); *G06T 7/001* (2013.01); *G06V 10/56* (2022.01); *G06V 10/751* (2022.01); *G06T 2207/10024* (2013.01); *G06T 2207/20081* (2013.01); *G06T 2207/30108* (2013.01); *G06T 2207/30168* (2013.01); *G06V 10/20* (2022.01); *G06V 2201/06* (2022.01)

(58) Field of Classification Search
CPC .. G06V 10/7715; G06V 10/56; G06V 10/751; G06V 10/20; G06V 2201/06; G06T 7/001; G06T 2207/10024; G06T 2207/20081; G06T 2207/30108; G06T 2207/30168

See application file for complete search history.

(56) References Cited

U.S. PATENT DOCUMENTS

| | | | | |
|---|---|---|---|---|
| 2019/0147586 | A1* | 5/2019 | Ikeda | ................... G06T 7/0004 382/157 |
| 2020/0111217 | A1* | 4/2020 | Yokoyama | ............. G06N 3/047 |
| 2020/0250801 | A1* | 8/2020 | He | ........................ G06T 7/0008 |

FOREIGN PATENT DOCUMENTS

| | | |
|---|---|---|
| JP | 2018-205163 A | 12/2018 |
| JP | 2019-091249 A | 6/2019 |
| JP | 2020-051982 A | 4/2020 |
| KR | 10-2021-0072282 A | 6/2021 |
| KR | 10-2021-0117782 A | 9/2021 |
| KR | 10-2343272 B1 | 12/2021 |

(Continued)

*Primary Examiner* — Samir A Ahmed
(74) *Attorney, Agent, or Firm* — Bridgeway IP Law Group, PLLC; Jihun Kim

(57) ABSTRACT

Embodiments relate to a deep learning/AI-based product surface quality inspection system which is accurate and reliable in product quality inspection which is a core task in an injection process among various manufacturing fields. The system can provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

7 Claims, 6 Drawing Sheets

(56) References Cited

FOREIGN PATENT DOCUMENTS

| | | | |
|---|---|---|---|
| KR | 10-2022-0067933 A | | 5/2022 |
| KR | 102644815 B1 | * | 3/2024 |
| KR | 102686788 B1 | * | 7/2024 |

* cited by examiner

```
area: 187.0
bounds: (94.0, 265.0, 166.0, 324.0)
length: 6369.122613653715
line_length: 93.08598175880189
point_on_surface: POINT (128 294.5)
```

DEEP LEARNING-BASED QUALITY INSPECTION SYSTEM APPLICABLE TO INJECTION PROCESS AND CONTROL METHOD THEREOF

CROSS-REFERENCE TO RELATED APPLICATIONS

This application claims the priority of Korean Patent Application No. 10-2023-0098387 filed on Jul. 27, 2023, in the Korean Intellectual Property Office, the disclosure of which is incorporated herein by reference.

BACKGROUND

Field

The present disclosure relates to a method and a system of deep learning/AI-based product surface quality inspection which are accurate and reliable in product quality inspection which is a core task in an injection process among various manufacturing fields.

Description of the Related Art

In general, a process environment is complex and collected images are not clear, so clear images are required for model learning, and image quality analysis and filtering must be done before the model learning.

At this time, an image classification artificial intelligence (AI) method requires a large amount of non-defective manufactured products and defective data for learning, but since the defect rate is low in the actual process, it is difficult to collect a large amount of defective data, so there are significantly fewer cases of surface inspection AI application in manufacturing.

In addition, according to a conventional method, AI accuracy was unstable due to incorrect application of classification criteria at the manufacturing site, making field application difficult.

Furthermore, according to the prior art, the size, length, color, etc. of each detected defect varied depending on a type, so there was a problem in that it was difficult to set a single criterion for all facilities and train a network.

Therefore, there is a growing need for systems and methods that can be easily used by anyone with AI that does not require prior learning of various types of defects that appear on the product surface, and that can be quickly applied to a rapidly changing manufacturing environment because labeling is not required.

SUMMARY

In order to solve the problems in the prior art, an object to be achieved by the present disclosure is to provide a deep learning/AI-based product surface quality inspection method and system which are accurate and reliable in product quality inspection which is a core task in an injection process among various manufacturing fields.

Particularly, the present disclosure may provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

Further, the present disclosure includes quality analysis of images, learning of non-defective manufactured product images, design of measurement methods for injection process products, and the like, and the deep learning-based injection process product quality inspection technology may minimize a problem such as poor detection of a defect in an actual injection process environment, and is intended to be extensively applied even to other manufacturing fields.

Another object to be achieved by the present disclosure is to modify model architecture and a loss function to stabilize field application of deep learning-based quality inspection technology.

Yet another object to be achieved by the present disclosure is to use defect inspection as final judgment without adding AI technology or training to a defect measurement step due to difficulty in field application because a non-defective manufactured product criterion is different for each factory.

Further, since the deep learning-based quality inspection technology applicable to the injection process proposed by the present disclosure is artificial intelligence already learned by the non-defective manufactured product image, users need not separately construct learning data, and the deep learning-based quality inspection technology is intended to be quickly applied even in a manufacturing field such as small quantity production of multiple products.

Meanwhile, the technical objects to be achieved in the present disclosure are not limited to the aforementioned technical objects, and other technical objects, which are not mentioned above, will be apparently understood to a person having ordinary skill in the art from the following description.

According to an aspect of the present disclosure, there is provided a deep learning-based quality inspection method applicable to an injection process. The deep learning-based quality inspection method applicable to an injection process includes: step 1 of receiving, by an input unit, a non-defective manufactured product image data set; step 2 of extracting, by a controller, at least one attribute of an objectness value in an image, a brightness value, a contrastive value, and an object angle value in the image for each of a plurality of images included in the image data set; step 3 of performing, by the controller, statistical analysis including at least one of an average and a standard deviation using the extracted attributes and calculating a quality score for each of the plurality of images using the performed statistical analysis; step 4 of determining, by the controller, an image having quality higher than a predetermined quality score among the plurality of images based on the calculated quality score; step 5 of preprocessing, by the controller, the determined quality image by applying at least one of resizing and padding processes for feature extraction; step 6 of extracting, by the controller, non-defective manufactured product features that are the criteria for the non-defective manufactured product from the preprocessed quality image; step 7 of generating, by the controller, a plurality of fake defective manufactured product features; step 8 of performing, by the controller, learning based on at least some of the determined quality image, the extracted non-defective manufactured product features, and the plurality of fake defective manufactured product features; step 9 of receiving, by the input unit, an actual image; step 10 of preprocessing, by the controller, the actual image by applying at least one of resizing and padding processes for feature extraction; step 11 of extracting, by the controller, actual features from the preprocessed actual image; step 12 of determining, by the controller, whether the extracted actual feature is a non-defective manufactured product or a defective manufactured product based on the contents learned in step 8; step 13 of deriving, by the controller, at least one of shape, length, width, diameter, radius, and circumference information of the defective area on the actual image, color information related to the defective area, and number information of the defective area, if the actual feature is the defective manufactured product; and step 14 of determining, by the controller, a first defective type to be matched based on the information derived in step 13 among predetermined defective types.

In step 2, the objectness value in the image may be a score obtained by comparing corresponding pixels while moving a template image from the upper left end to the lower right end in each of the plurality of input images, and the controller may determine the objectness based on a predetermined threshold.

In addition, in step 2, the image brightness value may be calculated as an average value of all pixels of each of the plurality of images, the image contrastive value may be calculated as a difference between the maximum and minimum values of all pixels in each of the plurality of images, and the object angle value in the image may be calculated by extracting the coordinates through detection of the outline of the object and then using the width and length of the outline.

In addition, step 6 may include step 6-1 of performing data augmentation with vertical and horizontal conversion to increase learning data related to the preprocessed quality image; and step 6-2 of extracting the non-defective manufactured product features from the preprocessed quality image with data augmentation through a convolution layer.

In step 12, a feature space of the extracted actual features may be visualized, candidate defective areas may be determined based on the visualized data, and finally, the defective area may be further determined among the candidate defective areas using a binary mask.

In step 13, the color information related to the defective area may include information on a color of the defective area, a color of a surrounding non-defective manufactured product area, and a color difference between the defective area and the surrounding non-defective manufactured product area.

According to another aspect of the present disclosure, there is provided a deep learning-based quality inspection system applicable to an injection process. The deep learning-based quality inspection system applicable to an injection process includes: an input unit configured to receive a non-defective manufactured product image data set; and a controller configured to extract at least one attribute of an objectness value in an image, a brightness value, a contrastive value, and an object angle value in the image for each of a plurality of images included in the image data set. The controller may perform statistical analysis including at least one of an average and a standard deviation using the extracted attributes and calculate a quality score for each of the plurality of images using the performed statistical analysis, determine an image having quality higher than a predetermined quality score among the plurality of images based on the calculated quality score, preprocess the determined quality image by applying at least one of resizing and padding processes for feature extraction, extract non-defective manufactured product features that are the criteria for the non-defective manufactured product from the preprocessed quality image, generate a plurality of fake defective manufactured product features, and perform learning based on at least some of the determined quality image, the extracted non-defective manufactured product features, and the plurality of fake defective manufactured product features. When the input unit receives an actual image, the controller may preprocess the actual image by applying at least one of resizing and padding processes for feature extraction, extract actual features from the preprocessed actual image, determine whether the extracted actual feature is a non-defective manufactured product or a defective manufactured product based on the learned contents, derive at least one of shape, length, width, diameter, radius, and circumference information of the defective area on the actual image, color information related to the defective area, and number information of the defective area, if the actual feature is the defective manufactured product, and determine a first defective type to be matched based on the derived information among predetermined defective types.

The objectness value in the image may be a score obtained by comparing corresponding pixels while moving a template image from the upper left end to the lower right end in each of the plurality of input images, and the controller may determine the objectness based on a predetermined threshold, the image brightness value may be calculated as an average value of all pixels of each of the plurality of images, the image contrastive value may be calculated as a difference between the maximum and minimum values of all pixels in each of the plurality of images, and the object angle value in the image may be calculated by extracting the coordinates through detection of the outline of the object and then using the width and length of the outline.

The controller may perform data augmentation with vertical and horizontal conversion to increase learning data related to the preprocessed quality image, and extract the non-defective manufactured product features from the preprocessed quality image with data augmentation through a convolution layer.

The controller may visualize a feature space of the extracted actual features, determine candidate defective areas based on the visualized data, and finally, further determine the defective area among the candidate defective areas using a binary mask, and the color information related to the defective area may include information on a color of the defective area, a color of a surrounding non-defective manufactured product area, and a color difference between the defective area and the surrounding non-defective manufactured product area.

According to the present disclosure, it is expected to be applicable to various manufacturing sites that require product surface inspection using injection process quality inspection.

According to the present disclosure, it is possible to provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

Further, the present disclosure includes quality analysis of images, learning of non-defective manufactured product images, design of measurement methods for injection process products, and the like, and the deep learning-based injection process product quality inspection technology may minimize a problem such as poor detection of a defect in an actual injection process environment, and can be extensively applied even to other manufacturing fields.

According to the present disclosure, it is possible to modify model architecture and a loss function to stabilize field application of the deep learning-based quality inspection technology.

According to the present disclosure, it is possible to use defect inspection as final judgment without adding AI technology or training to a defect measurement step due to difficulty in field application because a non-defective manufactured product criterion is different for each factory.

Further, since the deep learning-based quality inspection technology applicable to the injection process proposed by the present disclosure is artificial intelligence already learned by the non-defective manufactured product image, users need not separately construct learning data, and the deep learning-based quality inspection technology may be quickly applied even in a manufacturing field such as small quantity production of multiple products.

A technical object to be achieved in the present disclosure is not limited to the aforementioned effects, and other not-mentioned effects will be obviously understood by those skilled in the art from the description below.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Hereinafter, a preferred exemplary embodiment of the present disclosure will be described with reference to drawings. In addition, the exemplary embodiments described below does not unduly limit the content of the present disclosure described in the claims, and it cannot be said that all of the configurations described in the exemplary embodiments are essential as a solution to the present disclosure.

Deep Learning-Based Quality Inspection System Applicable to Injection Process

Figure 1:
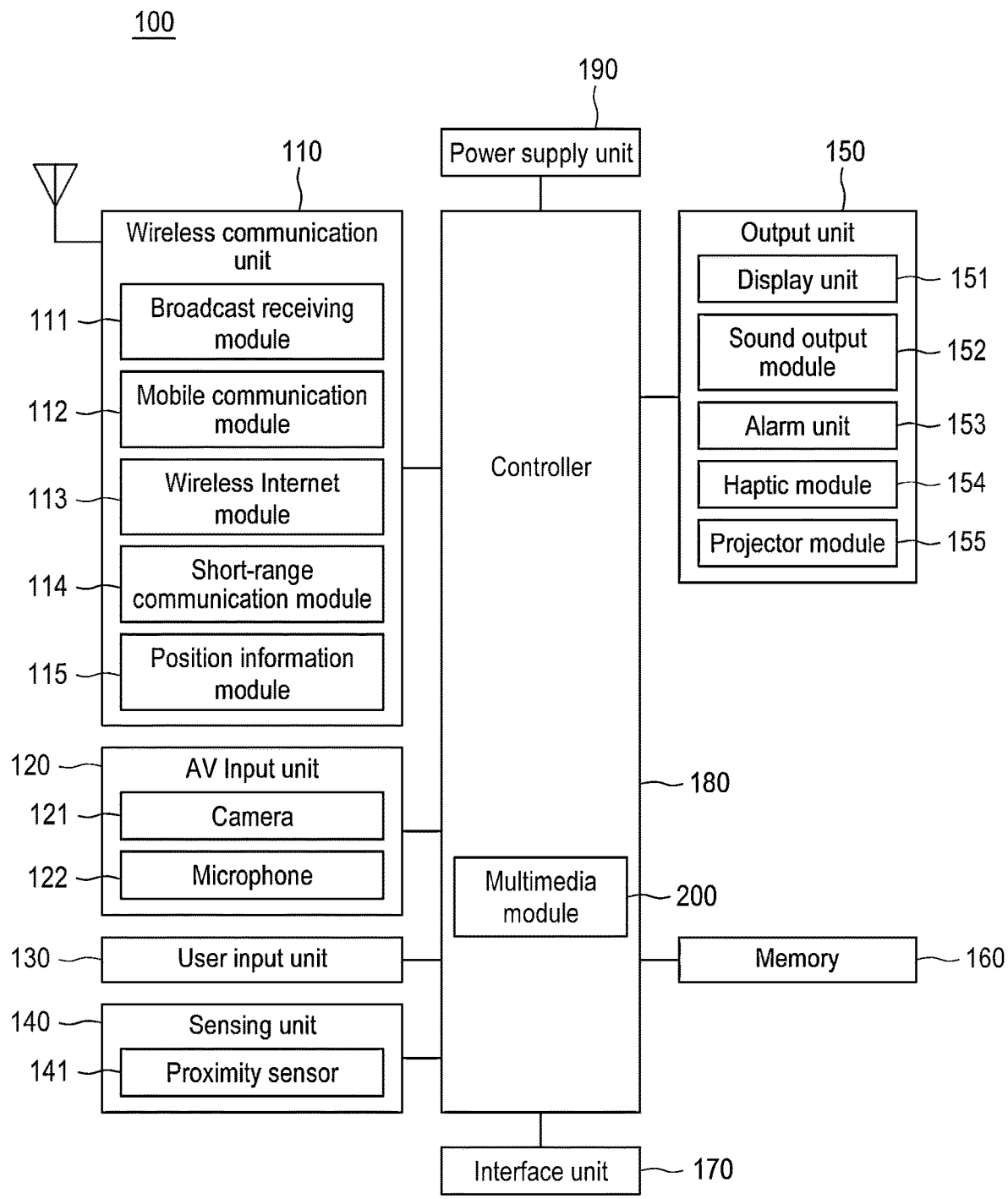
FIG. 1 illustrates a block diagram of a deep learning-based quality inspection system applicable to an injection process proposed by the present disclosure.

FIG. 1 illustrates a block diagram of a deep learning-based quality inspection system applicable to an injection process proposed by the present disclosure.

Referring to FIG. 1, a quality inspection system 100 according to the present disclosure may include a wireless communication unit 110, an audio/video (A/V) input unit 120, a user input unit 130, a sensing unit 140, an output unit 150, a memory 160, an interface unit 170, a controller 180, and a power supply unit 190.

However, the components illustrated in FIG. 1 are not required. Therefore, the quality inspection system having more components therethan or fewer components therethan may be implemented.

Hereinafter, the components will be described in sequence.

The wireless communication unit 110 may include one or more modules which enable wireless communication between the quality inspection system and a wireless communication system or between the quality inspection system and a network at which the quality inspection system is positioned. For example, the wireless communication unit 110 may include a broadcast receiving module 111, a mobile communication module 112, a wireless Internet module 113, a short-range communication module 114, and a position information module 115.

The broadcast receiving module 111 receives broadcast signals and/or broadcast-related information from an external broadcast management server through a broadcast channel.

The broadcast channel may include a satellite channel and a terrestrial channel. The broadcast management server may be a server for generating and transmitting the broadcast signals and/or broadcast-related information or a server for receiving previously generated broadcast signals and/or broadcast-related information and transmitting the received broadcast signals and/or broadcast-related information to the quality inspection system. The broadcast signals may include a TV broadcast signal, a radio broadcast signal, and a data broadcast signal and include even a broadcast signal of a type in which the data broadcast signal is combined with the TV broadcast signal or the radio broadcast signal.

The broadcast-related information may mean information related to a broadcast channel, a broadcast program, or a broadcast service provider. The broadcast-related information may be provided even through a mobile communication network. In this case, the broadcast-related information may be received by the mobile communication module 112.

The broadcast-related information may exist in various types. For example, the broadcast-related information may exist as a type such as electronic program guide (EPG) of digital multimedia broadcasting (DMB) or electronic service guide (ESG) of digital video broadcast-handheld (DVB-H).

The broadcast signal and/or broadcast-related information received through the broadcast receiving module 111 may be stored in the memory 160.

The mobile communication module 112 transmits/receives a radio signal to/from at least one of a base station, an external quality inspection system, and a server on a mobile communication network.

The wireless Internet module 113 may refer to a module for wireless Internet access and may be internally or externally built in the quality inspection system. As the wireless Internet technology, wireless LAN (WLAN) (Wi-Fi), wireless broadband (Wibro), world interoperability for microwave access (Wimax), high speed downlink packet access (HSDPA), or the like, may be used.

The short-range communication module 114 represents a module for short-range communication. As short-range communication technology, Bluetooth, radio frequency identification (RFID), infrared data association (IrDA), ultra wideband (UWB), ZigBee, or the like may be used.

The position information module 115 is a module for acquiring the position of the quality inspection system and a representative example thereof is a global position system (GPS) module.

Referring to FIG. 1, an audio/video (A/V) input unit 120 which is used for inputting an audio signal or a video signal may include a camera 121, a microphone 122, and the like.

The camera 121 processes an image frame such as a still image or a moving picture obtained by an image sensor in a photographing mode. The processed image frame may be displayed on the display unit 151.

The images frame processed by the camera 121 may be stored in the memory 160 or transmitted to the outside through the wireless communication unit 110.

A plurality of cameras 121 are used according to a usage environment.

The microphone 122 receives an external sound signal by a microphone in a recording mode, a voice recognition mode, or the like, and processes the received external sound signal as electrical voice data. The processed voice data may be converted into a transmittable form and output to a mobile communication base station through the mobile communication module 112. Various noise removal algorithms may be implemented in the microphone 122 to remove noise generated in receiving the external sound signal.

The user input unit 130 generates input data for the user to control the operation of the quality inspection system. The user input unit 130 may include a keypad, a dome switch, a touch pad (resistive/capacitive), a jog wheel, a jog switch, and the like.

In the present disclosure, the user may input a non-defective manufactured product image data set through the user input unit 130.

Of course, in addition to receiving images of the non-defective manufactured product from the user, it is also possible to automatically input information about non-defective manufactured product image results that are automatically machine-learned from other systems. The sensing unit 140 generates a sensing signal for controlling the operation of the quality inspection system by detecting a current state of the quality inspection system, such as the open/closed state of the quality inspection system, the location of the quality inspection system, the presence or absence of user contact, the direction of the quality inspection system, and the acceleration/deceleration of the quality inspection system. Further, the sensing unit 140 may also sense whether the power supply unit 190 supplies power, whether the interface unit 170 is combined with the external apparatus, and the like. Meanwhile, the sensing unit 140 may include a proximity sensor 141.

The output unit 150 which is used for generating an output related with sight, hearing, or touch may include a display unit 151, a sound output module 152, an alarm unit 153, a haptic module 154, a projector module 155, etc.

The display unit 151 displays (outputs) information processed in the quality inspection system.

The display unit 151 may include at least one of a liquid crystal display (LCD), a thin film transistor-liquid crystal display (TFT LCD), an organic light-emitting diode (OLED), a flexible display, and a 3D display.

Some displays among them may be configured as a transparent or light transmissive type to view the outside through the displays. This may be called a transparent display and a representative example of the transparent display includes a transparent OLED (TOLED), and the like. A rear structure of the display unit 151 may also be configured as a light transmission structure. By such a structure, the user may see an object positioned behind a quality inspection system body through a region occupied by the display unit 151 of the quality inspection system body.

When the display unit 151 and a sensor (hereinafter, referred to as 'touch sensor') sensing a touch operation form a mutual layer structure (hereinafter, referred to as 'touch screen'), the display unit 151 may be used as an input apparatus as well as the output apparatus. The touch sensor may take the form of, for example, a touch film, a touch sheet, a touch pad, or the like.

The touch sensor may be configured to convert a change in pressure applied to a specific portion of the display unit 151 or capacitance generated at the specific portion of the display unit 151 into an electrical input signal. The touch sensor may be configured to detect touch pressure as well as touched position and area.

When there is a touch input for the touch sensor, a signal(s) corresponding to the touch input is (are) sent to a touch controller. The touch controller processes the signal(s) and thereafter, transmits data corresponding thereto to the controller 180. As a result, the controller 180 may know which region of the display unit 151 is touched.

The proximity sensor 141 may be disposed within an internal region of the quality inspection system covered by the touch screen or in the vicinity of the touch screen. The proximity sensor refers to a sensor that detects the presence or absence of an object approaching a predetermined detection surface or an object which exists nearby without mechanical contact using electromagnetic field force or infrared rays. The proximity sensor has a longer lifetime and higher utilization than the touch sensor.

Examples of the proximity sensor include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. When the touch screen is a capacitive sensor, the touch screen is configured to detect the proximity of the pointer by a change of an electric field depending on the proximity of the pointer. In this case, the touch screen (touch sensor) may be classified as the proximity sensor.

The sound output module 152 may output audio data received from the wireless communication unit 110 or stored in the memory 160 in a recording mode, a voice recognition mode, a broadcast receiving mode, and the like.

The sound output module 152 may output a sound signal related to a function performed by the quality inspection system. The sound output module 152 may include a receiver, a speaker, a buzzer, and the like.

The alarm unit 153 outputs a signal for notifying occurrence of an event of the quality inspection system. An example of the event which occurs in the quality inspection system includes message reception, key signal input, touch input, etc. The alarm unit 153 may also output another form other than a video signal or an audio signal, for example, a signal for notifying the occurrence of the event by vibration. The video signal or the audio signal may be output through the display unit 151 or the sound output module 152 so that the display unit 151 and the sound output module 152 may be classified as a part of the alarm unit 153.

The haptic module 154 generates various tactile effects that the user may feel. A typical example of the tactile effect generated by the haptic module 154 is vibration. The intensity and pattern of the vibration generated by the haptic module 154 are controllable.

In addition to the vibration, the haptic module 154 may generate various tactile effects including effects by stimulus including pin arrangement vertically moving with respect to a contact skin surface, spraying force or suction force of the air through an injection port or a suction port, a touch on the skin surface, contact with an electrode, electrostatic force, and the like and an effect of reproducing a cold and warm sensation using a heat absorbing or heatable element.

The haptic module 154 may be implemented not only to transmit the tactile effect through direct contact but also to allow the user to feel the tactile effect through the muscle sensation of the finger or arm. At least two haptic modules 154 may be provided according to a configuration aspect of the hand-held quality inspection system.

The projector module 155 as a component for performing an image project function by using the quality inspection system may display an image which is equal to or at least partially different from an image displayed on the display unit 151 according to a control signal of the controller 180, on an external screen or a wall.

Specifically, the projector module 155 may include a light source (not illustrated) that generates light (for example, laser light) for outputting an image to the outside, an image generating means (not illustrated) for generating an image to be output to the outside using the light generated by the light source, and a lens (not illustrated) for enlarging and outputting the image at a predetermined focal distance to the outside. In addition, the projector module 155 may include a device (not illustrated) capable of adjusting an image projection direction by mechanically moving the lens or the entire module.

The projector module 155 may be divided into a cathode ray tube (CRT) module, a liquid crystal display (LCD) module, a digital light processing (DLP) module, and the like according to the element type of the display means. In particular, the DLP module may be advantageous for miniaturization of the projector module 155 by enlarging and projecting an image generated by reflecting the light generated from the light source on a digital micromirror device (DMD) chip.

The memory 160 may store a program for processing and control of the controller 180 and may perform a function for temporarily storing input/output data (e.g., a message, an audio, a still image, a moving picture, or the like). The memory 160 may also store a usage frequency for each data jointly. Further, the memory 160 may store data regarding various patterns of vibrations and sounds output in the touch input on the touch screen.

The memory 160 may include at least one type of storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The interface unit 170 serves as a passage with all external devices connected to the quality inspection system. The interface unit 170 receives data from the external device or receives power to deliver power to each component in the quality inspection system or transmits data in the quality inspection system to the external device. For example, the interface unit 170 may include a wireless/wired headset port, an external charger port, a wired/wireless data port, a memory card port, a port connecting a device with an identification module, an audio input/output (I/O) port, a video input/output (I/O) port, an earphone port, and the like.

The identification module as a chip for storing various information for authenticating use rights of the quality inspection system may include a user identification module (UIM), a subscriber identity module (SIM), a universal subscriber identity module (USIM), and the like. An apparatus (hereinafter referred to as an "identification apparatus") with the identification module may be manufactured in a smart card format. Therefore, the identification apparatus may be connected with the quality inspection system via the port.

The interface unit may become a passage through which the power from a cradle is supplied to a mobile quality inspection system when the mobile quality inspection system is connected to the external cradle or may be a passage through which various command signals input from the cradle by the user are transmitted to the mobile quality inspection system. The various command signals or the power input from the cradle may serve as a signal for recognizing that the mobile quality inspection system is correctly mounted on the cradle.

The controller 180 generally controls all motions of the quality inspection system.

The controller 180 may include a multimedia module 181 for reproducing multimedia. The multimedia module 181 may be implemented in the controller 180 or implemented apart from the controller 180.

The power supply unit 190 receives external power and internal power by a control of the controller 180 to supply power required for operations of respective components.

Various exemplary embodiments described herein may be implemented in a computer-readable recording medium or a recording medium readable by a device similar to the computer by using, for example, software, hardware, or a combination thereof.

According to hardware implementation, the exemplary embodiment described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the specification may be implemented by the controller 180 itself.

According to software implementation, exemplary embodiments such as a procedure and a function described in the specification may be implemented by separate software modules. Each of the software modules may perform one or more functions and operations described in the specification. A software code may be implemented by a software application written by an appropriate program language. The software code may be stored in the memory 160 and executed by the controller 180.

Deep Learning-Based Quality Inspection Method Applicable to Injection Process

A quality inspection method proposed by the present disclosure will be described in detail based on the configuration of the deep learning-based quality inspection system applicable to the injection process described above.

The present disclosure relates to a deep learning/AI-based product surface quality inspection method which is accurate and reliable in product quality inspection which is a core task in an injection process among various manufacturing fields.

In the present disclosure, all pipelines of product quality inspection are developed considering characteristics of a factory environment and an actual product production process by using only a non-defective manufactured product image unlike most injection process surface inspection AIs developed to date. The present disclosure shows better performance than non-defective/defective manufactured product classification methodology which is an existing commonly used method.

The present disclosure includes quality analysis of images, learning of non-defective manufactured product images, design of measurement methods for injection process products, and the like, and the deep learning-based injection process product quality inspection technology may minimize a problem such as poor detection of a defect in an actual injection process environment, and is expected to be extensively applied even to other manufacturing fields.

In the prior art, there is a problem in that the process environment is complex, and the collected images are not clear, so clear images are required for model learning, and image quality analysis and filtering must be done before the model learning.

Further, an image classification AI required a large amount of non-defective manufactured products and defective data for learning, but since the defect rate was low in the actual process, it was difficult to collect a large amount of defective data, so there were significantly fewer cases of surface inspection AI application in manufacturing industry.

In contrast, the present disclosure has an advantage of being easily applied to a manufacturing site by inspecting the defect by using only the non-defective manufactured product image.

In addition, AI accuracy was unstable due to incorrect application of classification criteria at the manufacturing site, making field application difficult.

However, the present disclosure may modify model architecture and a loss function to stabilize field application of deep learning-based quality inspection technology.

According to the prior art, the size, length, color, etc. of each detected defect varied depending on the type, so there was a problem in that it was difficult to set a single criterion for all facilities and train the network.

The present disclosure solves the problems and may be easily used by anyone with AI that does not require prior learning of various types of defects that appear on the product surface and is expected to be quickly applied to a rapidly changing manufacturing environment because labeling is not required.

Image data collected in the manufacturing industry is often not clear, but clear data is essential for subsequent training.

Image quality analysis is performed based on the inclusion of objects in the image, brightness, contrast, etc., and only clear images are selected by removing low-quality images.

Figure 2:
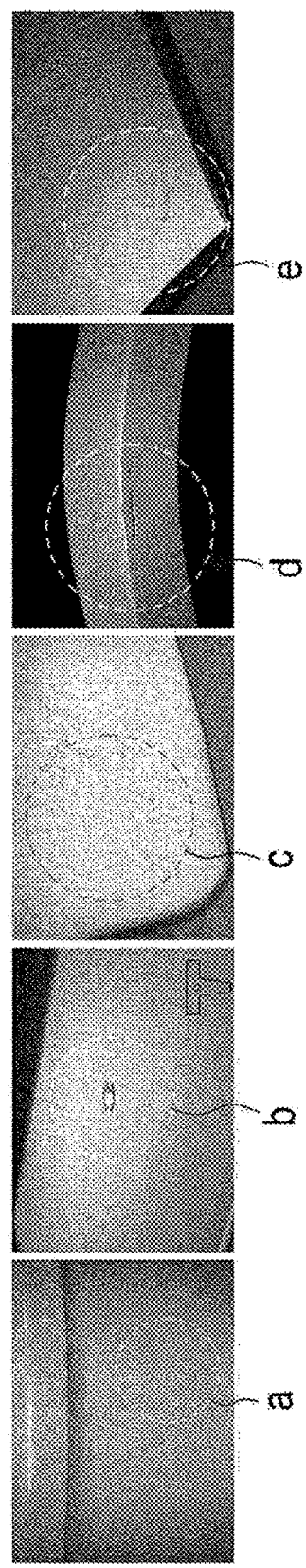
FIG. 2 illustrates an example of a defect type according to the present disclosure.

Although various types of defects appear on the product surface, their features differ significantly in background, color, shape, or appearance, as shown in an image in FIG. 2.

FIG. 2 illustrates an example of a defect type according to the present disclosure.

Referring to FIG. 2, occurring defect types include weldline (a), void (b), crazing/cracking (c), delamination (d), cloudy surface (e), and the like.

In the prior art, although the defects were the same, the characteristics of the defects appeared slightly differently, making it difficult to train an AI model.

The present disclosure may determine whether a product is non-defective or defective by learning only the non-defective manufactured product image without using various defective images.

Further, defect inspection is used as final judgment without adding AI technology or training to a defect measurement step due to difficulty in field application because a non-defective manufactured product criterion is different for each factory.

Further, since the deep learning-based quality inspection technology applicable to the injection process proposed by the present disclosure is artificial intelligence already learned by the non-defective manufactured product image, users need not separately construct learning data, and the deep learning-based quality inspection technology is expected to be quickly applied even in a manufacturing field such as small quantity production of multiple products.

Figure 3:
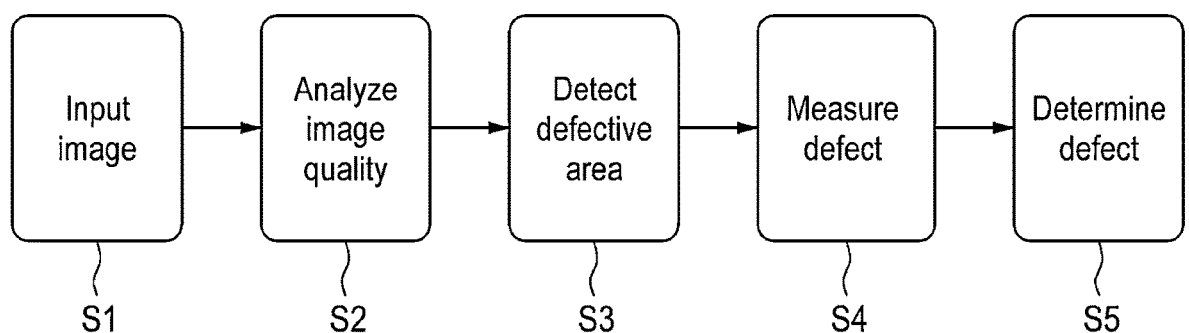
FIG. 3 illustrates an example of a flowchart of an injection process quality inspection pipeline according to the present disclosure.

FIG. 3 illustrates an example of a flowchart of an injection process quality inspection pipeline according to the present disclosure.

Referring to FIG. 3, an image input step (S1) is performed first.

Step S1 is a step of inputting a non-defective manufactured product image data set, by the user.

In addition, an image quality analysis step (S2) is performed.

In step S2, image attributes including objectness in an image, brightness, contrastive, angle, and the like are extracted.

In addition, statistical analysis is performed on average, standard deviation, and the like of the image attributes, and image quality scores are calculated based on the results to determine rankings.

In addition, low-quality images are removed, and only clear images are selected for training.

Next, a defective area detection step (S3) is performed.

In step S3, preprocessing is performed to accurately and easily perform feature extraction.

In addition, clear (high quality) non-defective manufactured product image features are extracted.

In addition, the features of a fake synthesized defective image are generated, the features of the non-defective manufactured product image and the defective image are compared and determined, and the defective area may be inferred based thereon.

After step S3, a defect measurement step (S4) is performed.

In step S4, the shape, length, width, diameter, radius, circumference, etc. of the defective area may be inspected.

In addition, color measurement may include the color of a defective area, the color of a surrounding non-defective area, and a color difference between the defective area and the surrounding non-defective manufactured product area.

In addition, it is also possible to measure the number of defects.

Finally, a defect determination step (S5) is performed to present a defect type based on the defect measurement results.

As a result, the present disclosure is expected to be applicable to various manufacturing sites that require product surface inspection using injection process quality inspection.

Figure 4:
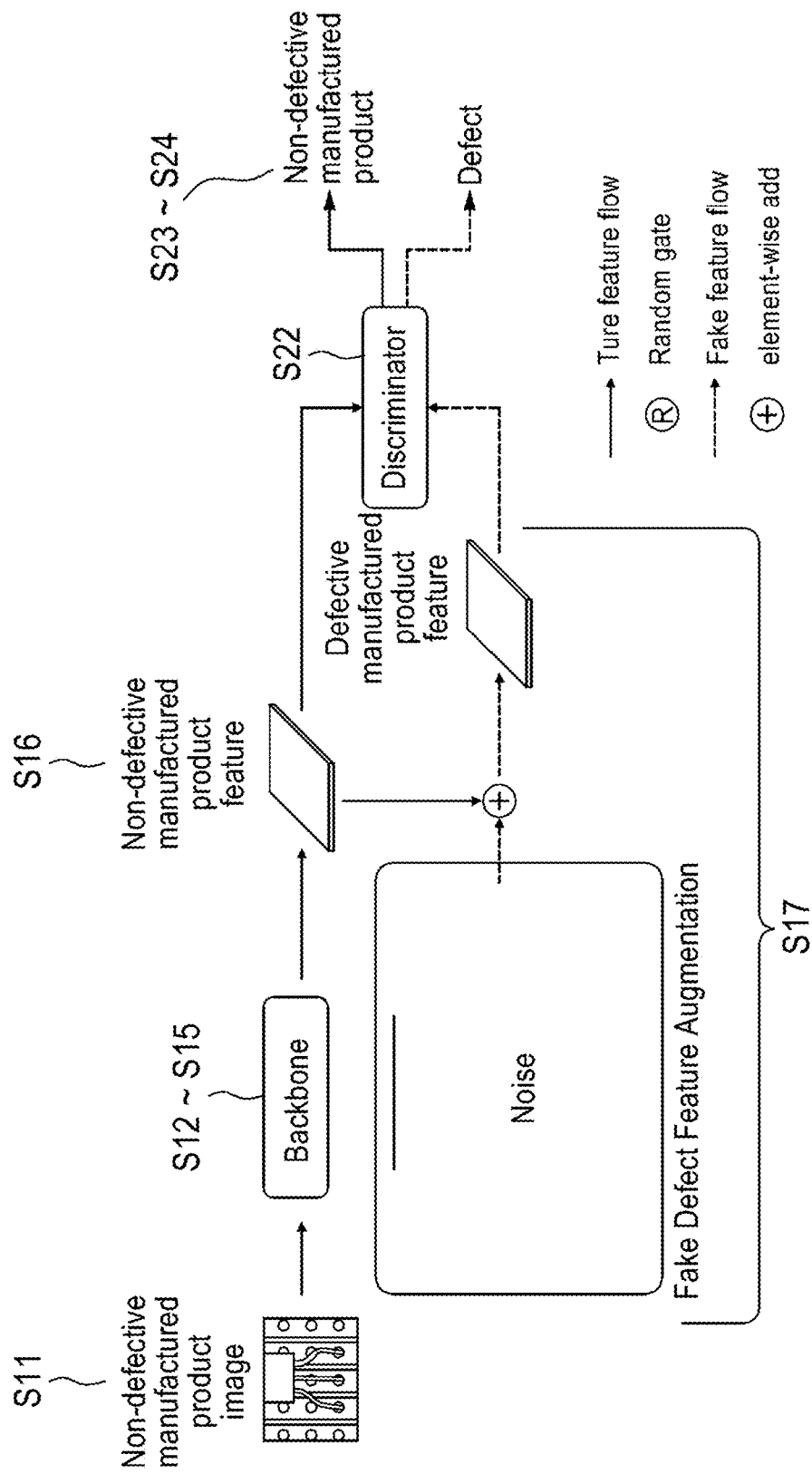
FIG. 4 illustrates an example of an injection process defective area detection AI model procedure according to the present disclosure.

FIG. 4 illustrates an example of an injection process defective area detection AI model procedure according to the present disclosure, which illustrates the process of FIG. 3 in more detail.

Referring to FIG. 4, step S11 is illustrated in which the input unit 120 related to the image input step (S1) receives the non-defective manufactured product image data set.

In addition, with respect to step S2, steps S12 to S18 are illustrated.

That is, the controller extracts at least one attribute of an objectness value in an image, a brightness value, a contrastive value, and an object angle value in the image for each of a plurality of images included in the image data set, performs statistical analysis including at least one of an average and a standard deviation using the extracted attributes, calculates a quality score for each of the plurality of images using the performed statistical analysis, determines an image having quality higher than a predetermined quality score among the plurality of images based on the calculated quality score, and preprocesses the determined quality image by applying at least one of resizing and padding processes for feature extraction (S12 to S15).

Thereafter, the controller 180 extracts non-defective manufactured product features that are the criteria for the non-defective manufactured product from the preprocessed quality image (S16).

The meaning of the values calculated in the process is as follows.
1) Image objectness value: The objectness may be determined based on a preset threshold as a score obtained by comparing the corresponding pixels while moving a template image from the upper left end to the right side of the input image.
2) Image brightness value: Calculated as the average value of all pixels in the image.
3) Image contrastive value: Calculate a difference between the maximum and minimum values of all pixels in the image.
4) Object angle value in image: After extracting coordinates by detecting the outline of the object, the angle of the object is calculated using the width and length of the outline.

By using the average and standard deviation of an objectness score, a brightness value, a contrastive value, and an object angle of the non-defective manufactured product image described above, an image quality ranking may be determined, and low quality images below the threshold may be removed, and only a high quality image may be selected for training.

In addition, the controller generates a plurality of fake defective manufactured product features and generates a plurality of defective manufactured product images by applying the plurality of fake defective manufactured product features to the non-defective manufactured product features (S17).

Here, the preprocess of resizing and padding the input image may be performed so that the model may learn images of the same size.

In addition, data augmentation may be performed with vertical and horizontal conversion to increase the learning data.

In addition, high-quality non-defective manufactured product image features may be extracted using a convolution layer.

In addition, the synthesized defective image features may be generated by adding noise to the non-defective manufactured product image features.

In addition, a discriminator on the controller 180 may distinguish defects by training non-defective manufactured product images and fake synthetic defective images.

Thereafter, steps S22 to S24 related to steps S3 to S5 are performed.

That is, based on the learning based on at least some of the determined quality image, the extracted non-defective manufactured product features, the plurality of fake defective manufactured product features and the plurality of defective manufactured product images, when the input unit receives an actual image, the controller 180 preprocesses the actual image by applying at least one of resizing and padding processes to extract the features, extracts the actual features, and determines whether the extracted actual features are a non-defective manufactured product or a defective manufactured product based on the learned contents (S18 to S22).

Here, the input image may be preprocessed by resizing and padding so that the model may obtain images of the same size, and the features of a high-quality injection process image may be extracted through a convolution layer.

It is possible to determine whether an injection process image is defective or not by the discriminator of the controller 180.

In addition, the defective area of the injection process image may be obtained by visualizing a feature space.

In addition, the defective area may finally be extracted using a binary mask.

Thereafter, the input image may be preprocessed by resizing and padding so that the model may learn images of the same size as those used for learning even for the actual input images.

In addition, high-quality injection process image features may be extracted using the learned convolution layer, and the non-defective or defective manufactured product of the input image can be determined using the learned discriminator.

Here, the defective area within the image is represented by visualizing the feature space, and the defective area can be finally extracted using a binary mask.

Thereafter, in the case of the defective manufactured product, the controller derives at least one of shape, length, width, diameter, radius, and circumference information of the defective area on the actual image, color information related to the defective area, and number information of the defective area, and determines a defective type to be matched among predetermined defective types (S23 and S24).

In the defect measurement, the shape, length, width, diameter, radius, circumference, etc. of the defective area may be included.

In addition, the color measurement may include the color of a defective area, the color of a surrounding non-defective area, and a color difference between the defective area and the surrounding non-defective manufactured product area.

In addition, a defect number measurement result may be included.

Furthermore, defect determination may be performed by comparing the defect measurement result with a standard of a client and presenting a defect type.

Figure 5:
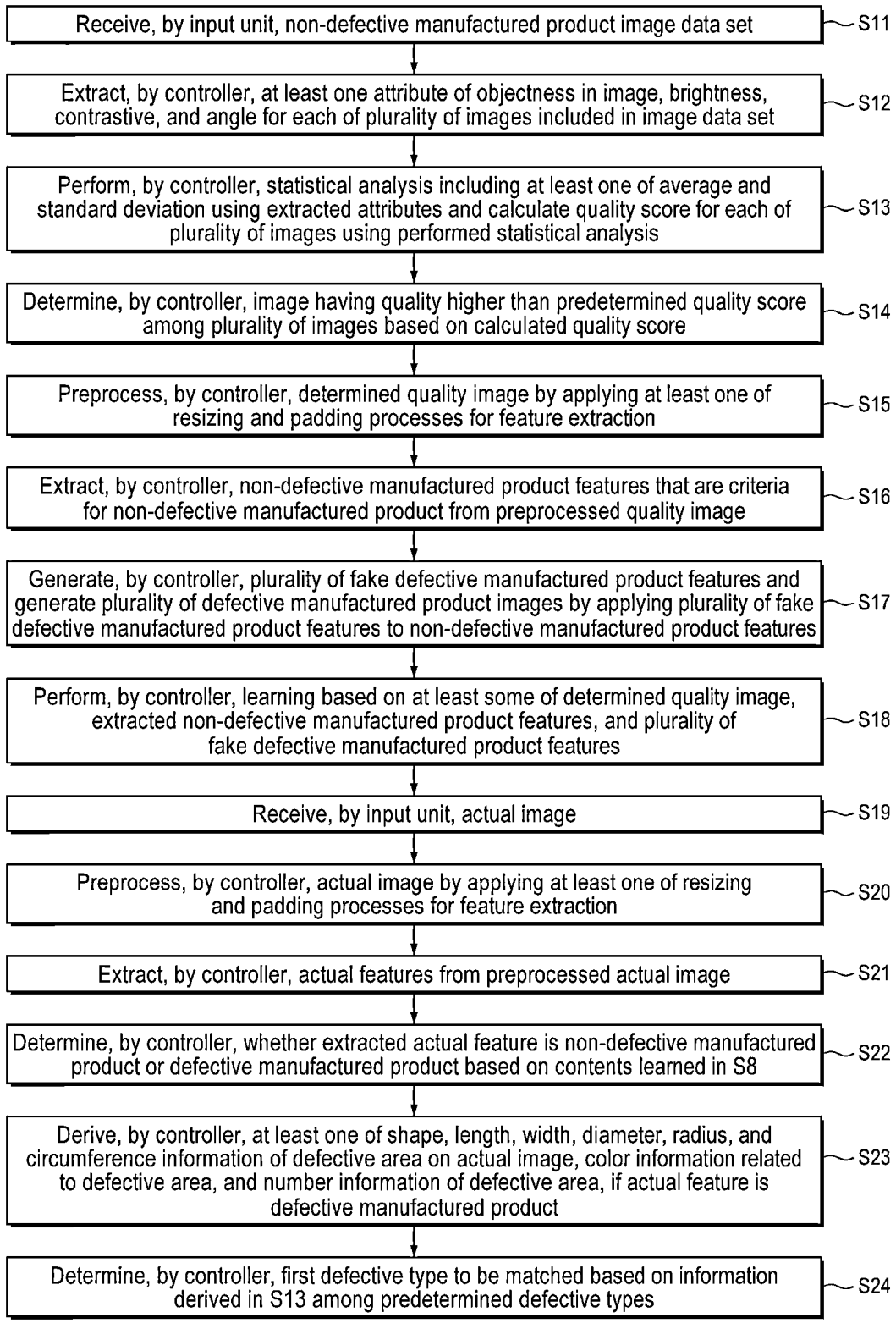
FIG. 5 is a flowchart specifically describing an overall process of a deep learning-based quality inspection method applicable to an injection process proposed by the present disclosure.

FIG. 5 is a flowchart specifically describing an overall process of a deep learning-based quality inspection method applicable to an injection process proposed by the present disclosure, which illustrates the overall process including FIGS. 3 and 4.

The overall process proposed by the present disclosure will be described in detail with reference to FIG. 5.

Referring to FIG. 5, first, step S11 is performed in which the input unit receives a non-defective manufactured product image data set.

In addition, step S12 is performed in which the controller extracts at least one attribute of an objectness value in an image, a brightness value, a contrastive value, and an object angle value in the image for each of the plurality of images included in the image data set.

In step S12, the objectness value in the image is a score obtained by comparing corresponding pixels while moving a template image from the upper left end to the lower right end in each of the plurality of input images, and the controller can determine the objectness based on a predetermined threshold.

In addition, the image brightness value may be calculated as an average value of all pixels of each of the plurality of images, the image contrastive value may be calculated as a difference between the maximum and minimum values of all pixels in each of the plurality of images, and the object angle value in the image may be calculated by extracting the coordinates through detection of the outline of the object and then using the width and length of the outline.

Thereafter, step S13 is performed in which the controller performs statistical analysis including at least one of an average and a standard deviation using the extracted attributes and calculates a quality score for each of the plurality of images using the performed statistical analysis.

In addition, step S14 is performed in which the controller determines an image having quality higher than a predetermined quality score among the plurality of images based on the calculated quality score.

In addition, step S15 is performed in which the controller preprocesses the determined quality image by applying at least one of resizing and padding processes for feature extraction.

Thereafter, step S16 is performed in which the controller extracts non-defective manufactured product features that are the criteria for the non-defective manufactured product from the preprocessed quality image.

Step S16 may be performed by including a step of performing data augmentation with vertical and horizontal conversion to increase learning data related to the preprocessed quality image and a step of extracting the non-defective manufactured product features from the preprocessed quality image with data augmentation through the convolution layer.

Thereafter, step S17 is performed in which the controller generates a plurality of fake defective manufactured product features and generates a plurality of defective manufactured product images by applying the plurality of fake defective manufactured product features to the non-defective manufactured product features.

In addition, step S18 is performed in which the controller performs learning based on at least some of the determined quality image, the extracted non-defective manufactured product features, the plurality of fake defective manufactured product features, and the plurality of defective manufactured product images.

At this time, when the input unit receives an actual image (S19), step S20 is performed in which the controller performs the preprocessing by applying at least one of resizing and padding processes of the actual image for feature extraction.

In addition, the controller extracts actual features from the preprocessed actual image (S21), and based on the learned contents, the controller determines whether the extracted actual features are a non-defective manufactured product or a defective manufactured product (S22).

In step S22, a feature space of the extracted actual features may be visualized, candidate defective areas may be determined based on the visualized data, and finally, the defective area may be further determined among the candidate defective areas using a binary mask.

Thereafter, if the actual feature is the defective manufactured product, step S23 is performed in which the controller derives at least one of shape, length, width, diameter, radius, and circumference information of the defective area on the actual image, color information related to the defective area, and number information of the defective area.

Here, the color information related to the defective area may include information on a color of the defective area, a color of a surrounding non-defective manufactured product area, and a color difference between the defective area and the surrounding non-defective manufactured product area.

In addition, step S24 is performed in which the controller determines a first defective type to be matched based on information derived from predetermined defective types.

Figures 6, 7:
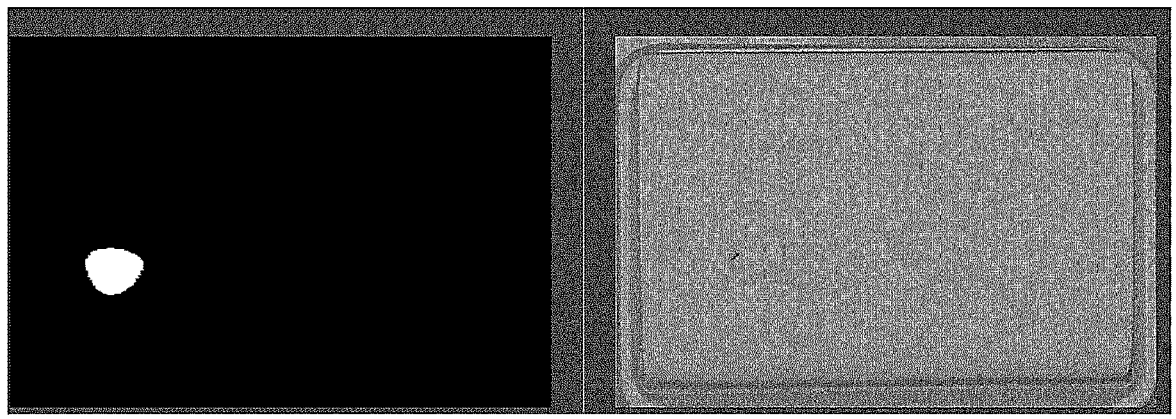
FIG. 6 illustrates an example of a result of images measured by a system of the present disclosure.
FIG. 7 illustrates an example of a defective measurement result derived from the system of the present disclosure.

FIG. 6 illustrates an example of images measured by a system of the present disclosure.

Referring to FIG. 6, a portion derived as a defective area on the image, defective information, and the like are presented.

Specifically, a left image of FIG. 6 illustrates a result of being marked as a defect through artificial intelligence (AI), and a right image illustrates an image of an actual defective manufactured product.

In addition, FIG. 7 illustrates an example of a defective measurement result derived from the system of the present disclosure.

Effects According to Present Disclosure

According to the present disclosure, it is expected to be applicable to various manufacturing sites that require product surface inspection using injection process quality inspection.

According to the present disclosure, it is possible to provide, to a user, better performance than non-defective/defective manufactured product classification methodology which is an existing commonly used method through a method and a system considering characteristics of a factory environment and an actual product production process for all pipelines of product quality inspection by using only a non-defective manufactured product image unlike most injection process surface inspection AIs developed to date.

Further, the present disclosure includes quality analysis of images, learning of non-defective manufactured product images, design of measurement methods for injection process products, and the like, and the deep learning-based injection process product quality inspection technology may minimize a problem such as poor detection of a defect in an actual injection process environment, and can be extensively applied even to other manufacturing fields.

According to the present disclosure, it is possible to modify model architecture and a loss function to stabilize field application of deep learning-based quality inspection technology.

According to the present disclosure, it is possible to use defect inspection as final judgment without adding AI technology or training to a defect measurement step due to difficulty in field application because a non-defective manufactured product criterion is different for each factory.

Further, since the deep learning-based quality inspection technology applicable to the injection process proposed by the present disclosure is artificial intelligence already learned by the non-defective manufactured product image, users need not separately construct learning data, and the deep learning-based quality inspection technology may be quickly applied even in a manufacturing field such as small quantity production of multiple products.

Meanwhile, the effects that may be obtained from the present disclosure are not limited to the aforementioned effects, and other not-mentioned effects will be obviously understood by those skilled in the art from the description below.

The exemplary embodiments of the present disclosure described above may be implemented through various means. For example, the exemplary embodiments of the present disclosure may be implemented by hardware, firmware, software, or combinations thereof.

When the exemplary embodiment is implemented by hardware, the method according to the exemplary embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

When the exemplary embodiment is implemented by firmware or software, the method according to the exemplary embodiments of the present disclosure may be implemented in a form such as a module, a procedure, or a function which performs the functions or operations described above. A software code may be stored in a memory unit to be driven by the processor. The memory unit may be positioned inside or outside the processor and may transmit and receive data to/from the processor by already known various means.

As described above, the detailed description of the preferred exemplary embodiments of the present disclosure disclosed above has been provided so as for those skilled in the art to implement and execute the present disclosure.

While the present disclosure has been described with reference to the preferred exemplary embodiments, it will be understood to those skilled in the art that various changes and modifications of the present disclosure can be made without departing from the scope of the present disclosure.

For example, those skilled in the art may use respective components disclosed in the exemplary embodiments by combining the respective components with each other.

Therefore, the present disclosure is not limited to the embodiments described herein, but intends to grant the widest range which is coherent with the principles and new features disclosed herein.

The present disclosure may be embodied in other specific forms without departing from the spirit and essential characteristics of the present disclosure.

Accordingly, the aforementioned detailed description should not be construed as restrictive in all terms and should be exemplarily considered.

The scope of the present disclosure should be determined by rational construing of the appended claims and all modifications within an equivalent scope of the present disclosure are included in the scope of the present disclosure.

The present disclosure is not limited to the embodiments described herein, but intends to grant the widest range which is coherent with the principles and new features presented herein.

Further, the claims that are not expressly cited in the claims are combined to form an exemplary embodiment or be included in a new claim by an amendment after the application.

What is claimed is:

1. A deep learning-based quality inspection method applicable to an injection process, comprising:
    step 1 of receiving, by an input unit, a non-defective manufactured product image data set;
    step 2 of extracting, by a controller, at least one attribute of an objectness value in an image, a brightness value, a contrastive value, and an object angle value in the image for each of a plurality of images included in the image data set;
    step 3 of performing, by the controller, statistical analysis including at least one of an average and a standard deviation using the extracted attributes and calculating a quality score for each of the plurality of images using the performed statistical analysis;
    step 4 of determining, by the controller, an image having quality higher than a predetermined quality score among the plurality of images based on the calculated quality score;
    step 5 of preprocessing, by the controller, the determined quality image by applying at least one of resizing and padding processes for feature extraction;
    step 6 of extracting, by the controller, non-defective manufactured product features that are criteria for a non-defective manufactured product from the preprocessed quality image;
    step 7 of generating, by the controller, a plurality of fake defective manufactured product features;
    step 8 of performing, by the controller, learning based on at least some of the determined quality image, the extracted non-defective manufactured product features, and the plurality of fake defective manufactured product features;
    step 9 of receiving, by the input unit, an actual image;
    step 10 of preprocessing, by the controller, the actual image by applying at least one of resizing and padding processes for the feature extraction;
    step 11 of extracting, by the controller, actual features from the preprocessed actual image;
    step 12 of determining, by the controller, whether the extracted actual feature is the non-defective manufactured product or a defective manufactured product based on the contents learned in step 8;
    step 13 of deriving, by the controller, at least one of shape, length, width, diameter, radius, and circumference information of a defective area on the actual image, color information related to the defective area, and number information of the defective area, if the actual feature is the defective manufactured product; and
    step 14 of determining, by the controller, a first defective type to be matched based on the information derived in step 13 among predetermined defective types,
    wherein in step 2, the objectness value in the image is a score obtained by comparing corresponding pixels while moving a template image from an upper left end to a lower right end in each of the plurality of input images, and the controller determines the objectness based on a predetermined threshold,
    in step 2,
    the image brightness value is calculated as an average value of all pixels of each of the plurality of images,
    the image contrastive value is calculated as a difference between maximum and minimum values of the all pixels in each of the plurality of images, and the object angle value in the image is calculated by extracting coordinates through detection of an outline of the object and then using a width and a length of the outline.

2. The deep learning-based quality inspection method applicable to the injection process of claim 1, wherein step 6 includes step 6-1 of performing data augmentation with vertical and horizontal conversion to increase learning data related to the preprocessed quality image; and step 6-2 of extracting the non-defective manufactured product features from the preprocessed quality image with the data augmentation through a convolution layer.

3. The deep learning-based quality inspection method applicable to the injection process of claim 2, wherein in step 12, a feature space of the extracted actual features is visualized, candidate defective areas are determined based on the visualized data, and finally, the defective area is further determined among the candidate defective areas using a binary mask.

4. The deep learning-based quality inspection method applicable to the injection process of claim 3, wherein in step 13, the color information related to the defective area includes information on a color of the defective area, a color of a surrounding non-defective manufactured product area, and a color difference between the defective area and the surrounding non-defective manufactured product area.

5. A deep learning-based quality inspection system applicable to an injection process, comprising:

an input unit configured to receive a non-defective manufactured product image data set; and a controller configured to extract at least one attribute of an objectness value in an image, a brightness value, a contrastive value, and an object angle value in the image for each of a plurality of images included in the image data set, wherein the controller performs statistical analysis including at least one of an average and a standard deviation using the extracted attributes and calculates a quality score for each of the plurality of images using the performed statistical analysis, determines an image having quality higher than a predetermined quality score among the plurality of images based on the calculated quality score, preprocesses the determined quality image by applying at least one of resizing and padding processes for feature extraction, extracts non-defective manufactured product features that are criteria for a non-defective manufactured product from the preprocessed quality image, generates a plurality of fake defective manufactured product features, and performs learning based on at least some of the determined quality image, the extracted non-defective manufactured product features, and the plurality of fake defective manufactured product features, when the input unit receives an actual image, the controller preprocesses the actual image by applying at least one of the resizing and padding processes for the feature extraction, extracts actual features from the preprocessed actual image, determines whether the extracted actual feature is the non-defective manufactured product or a defective manufactured product based on the learned contents, derives at least one of shape, length, width, diameter, radius, and circumference information of a defective area on the actual image, color information related to the defective area, and number information of the defective area, if the actual feature is the defective manufactured product, and determines a first defective type to be matched based on the derived information among predetermined defective types, wherein the objectness value in the image is a score obtained by comparing corresponding pixels while moving a template image from an upper left end to a lower right end in each of the plurality of input images, and the controller determines the objectness based on a predetermined threshold, the image brightness value is calculated as an average value of all pixels of each of the plurality of images, the image contrastive value is calculated as a difference between maximum and minimum values of the all pixels in each of the plurality of images, and the object angle value in the image is calculated by extracting coordinates through detection of an outline of the object and then using a width and a length of the outline.

6. The deep learning-based quality inspection system applicable to the injection process of claim 5, wherein the controller performs data augmentation with vertical and horizontal conversion to increase learning data related to the preprocessed quality image, and extracts the non-defective manufactured product features from the preprocessed quality image with the data augmentation through a convolution layer.

7. The deep learning-based quality inspection system applicable to the injection process of claim 6, wherein the controller visualizes a feature space of the extracted actual features, determines candidate defective areas based on the visualized data, and finally, further determines the defective area among the candidate defective areas using a binary mask, wherein the color information related to the defective area includes information on a color of the defective area, a color of a surrounding non-defective manufactured product area, and a color difference between the defective area and the surrounding non-defective manufactured product area.

* * * * *